United States Patent
Ebergen et al.

(10) Patent No.: US 7,417,993 B1
(45) Date of Patent: Aug. 26, 2008

(54) APPARATUS AND METHOD FOR HIGH-THROUGHPUT ASYNCHRONOUS COMMUNICATION

(75) Inventors: Josephus C. Ebergen, San Francisco, CA (US); Ivan E. Sutherland, Santa Monica, CA (US); Robert J. Drost, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1011 days.

(21) Appl. No.: 10/742,075

(22) Filed: Dec. 18, 2003

Related U.S. Application Data

(60) Provisional application No. 60/508,578, filed on Oct. 3, 2003, provisional application No. 60/443,592, filed on Jan. 29, 2003.

(51) Int. Cl.
*H04L 12/28* (2006.01)
*H04L 12/56* (2006.01)
*H04L 1/00* (2006.01)

(52) U.S. Cl. .................. 370/395.72; 370/412; 370/230; 370/235; 370/236; 370/247

(58) Field of Classification Search ................. 370/230, 370/231, 235, 236, 247
See application file for complete search history.

(56) References Cited

U.S. PATENT DOCUMENTS

| 6,138,189 | A | * | 10/2000 | Kalkunte | 710/53 |
| 6,141,324 | A | * | 10/2000 | Abbott et al. | 370/236 |
| 6,987,775 | B1 | * | 1/2006 | Haywood | 370/429 |
| 2004/0001435 | A1 | * | 1/2004 | Wong | 370/230 |

* cited by examiner

*Primary Examiner*—Firmin Backer
*Assistant Examiner*—Farah Faroul
(74) *Attorney, Agent, or Firm*—Park, Vaughan & Fleming LLP

(57) ABSTRACT

One embodiment of the present invention provides a system for high-throughput asynchronous communication that includes a sender and a receiver. A sender's first-in, first-out (FIFO) buffer is coupled to an input of the sender, a receiver's FIFO buffer is coupled to an input of the receiver, a forward communication channel is coupled between the sender and the receiver's FIFO buffer, and a reverse communication channel is coupled between the receiver and the sender's FIFO buffer. The forward communication channel, the receiver's FIFO buffer, the reverse communication channel, and the sender's FIFO buffer operate collectively as a network FIFO between the sender and the receiver. The network FIFO is configured to ensure that asynchronous communication between the sender and the receiver takes place reliably and without unnecessary waiting by the sender or the receiver.

21 Claims, 5 Drawing Sheets

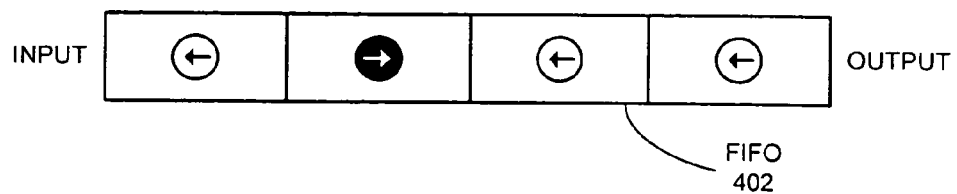
FIG. 4A
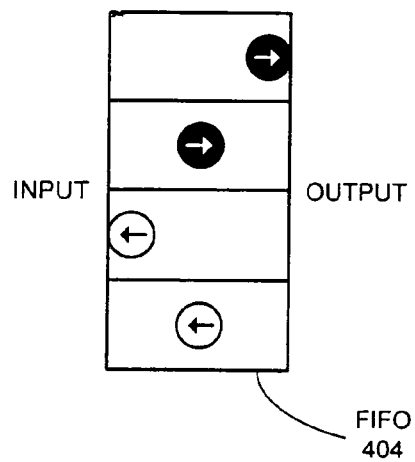
FIG. 4B
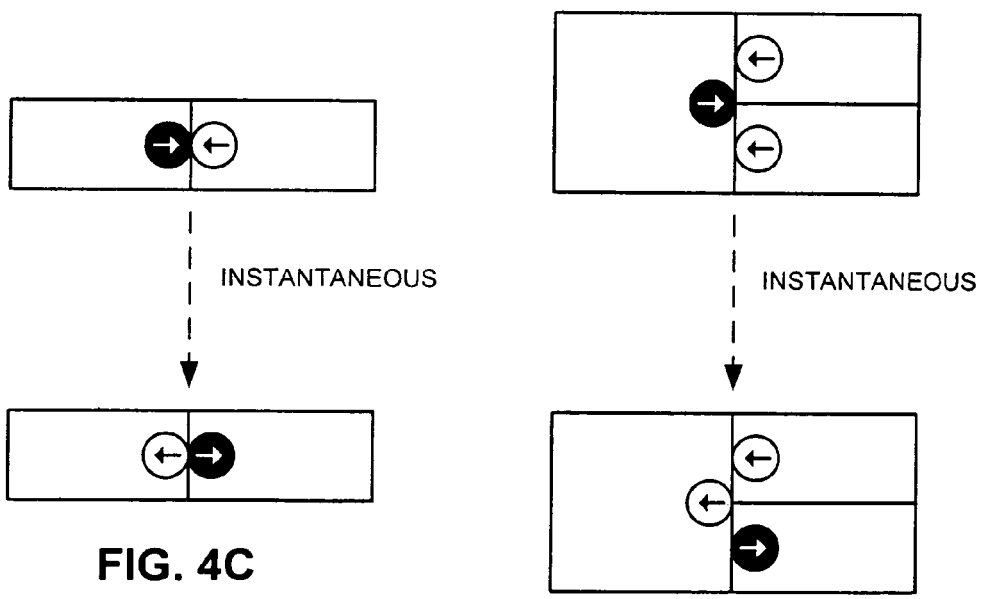
FIG. 4C
FIG. 4D

APPARATUS AND METHOD FOR HIGH-THROUGHPUT ASYNCHRONOUS COMMUNICATION

RELATED APPLICATIONS

This application hereby claims priority under 35 U.S.C. §119 to U.S. Provisional Patent Application No. 60/443,592, filed on 29 Jan. 2003, entitled, "High Throughput over High-Latency Asynchronous Communication," by inventors Josephus C. Ebergen, Ivan E. Sutherland, and Robert J. Drost. Additionally, this application hereby claims priority under 35 U.S.C. §119 to U.S. Provisional Patent Application No. 60/508,578, filed on 3 Oct. 2003, entitled, "Maintaining High Throughput FIFO Behavior over High-Latency Communication Channels," by inventors Josephus C. Ebergen, Ivan E. Sutherland, and Robert J. Drost.

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to communication networks. More specifically, the present invention relates to an apparatus and a method for high-throughput asynchronous communication over high-latency communication channels.

2. Related Art

Dramatic increases in computational speed in recent years have largely been facilitated by improvements in semiconductor integration densities, which presently allow hundreds of millions of transistors to be integrated into a single semiconductor chip. This makes it possible to incorporate a large amount of computational circuitry onto a semiconductor chip. Moreover, the small circuit dimensions made possible by improved integration densities have enabled this computational circuitry to operate at greatly increased speeds. While computational circuitry is growing increasingly faster, the delay involved in transferring data between system components is becoming more of a bottleneck.

For example, FIG. 1 illustrates communication channels between a sender 102 and receiver 104. The forward latency between sender 102 and receiver 104, including the delay in the forward channel 108, is df and the reverse latency between sender 102 and receiver 104, including the delay in the reverse channel 106, is dr. The network behaves like a one-stage FIFO with a cycle time of dr+df. The problem with the network of FIG. 1 is that the throughput of this communication network is low, because the cycle time is the sum of the large forward and reverse latencies.

When sender 102 sends a data item to receiver 104 through forward channel 108, receiver 104 receives the data item at an elapsed time of df. After receiver 104 receives the data item, receiver 104 places an acknowledge token into reverse channel 106 to acknowledge receipt of the data item. At an elapsed time of dr, sender 102 receives the acknowledge token and is free to send another data item to receiver 104. If sender 102 attempts to send a second data item before receiving the acknowledge token, it is possible for the second data item to be lost, or to corrupt the first data item.

The cycle times df and dr can be reduced somewhat by moving the components closer together. However, even when the components are touching each other, the cycles times continue to be very large compared with the cycle times of the individual circuits within the components.

Hence, what is needed is an apparatus and a method for high-throughput asynchronous communication between a sender and a receiver without the problems described above.

SUMMARY

One embodiment of the present invention provides a system for high-throughput asynchronous communication that includes a sender and a receiver. A sender's first-in, first-out (FIFO) buffer is coupled to an input of the sender, a receiver's FIFO buffer is coupled to an input of the receiver, a forward communication channel is coupled between the sender and the receiver's FIFO buffer, and a reverse communication channel is coupled between the receiver and the sender's FIFO buffer. The forward communication channel, the receiver's FIFO buffer, the reverse communication channel, and the sender's FIFO buffer operate collectively as a network FIFO between the sender and the receiver. The network FIFO is configured to ensure that asynchronous communication between the sender and the receiver takes place reliably and without unnecessary waiting by the sender or the receiver.

In a variation of this embodiment, the sender's FIFO buffer and the reverse communication channel are initialized with $nw_{send}$ white tokens and $nb_{send}$ black tokens, and the receiver's FIFO buffer and the forward communication channel are initialized with $nw_{rec}$ white tokens and $nb_{rec}$ black tokens.

In a further variation, the sender is configured to remove a white token from the sender's FIFO buffer, and upon removing the white token, to insert a first black token into the sender's FIFO buffer, and to simultaneously insert a second black token into the forward communication channel.

In a further variation, the second black token is a data item.

In a further variation, the receiver is configured to remove a black token from the receiver's FIFO buffer, and upon removing the black token, to insert a first white token into the receiver's FIFO buffer, and to simultaneously insert a second white token into the reverse communication channel.

In a further variation, the second white token is an acknowledge token.

In a further variation, the number of white tokens in the sender's FIFO buffer is less than or equal to the number of white tokens in the receiver's FIFO buffer, the cycle time of the receiver's FIFO buffer is less than the cycle time of the sender, and the reverse latency in the receiver's FIFO buffer is less than or equal to $(nw_{send}-nw_{rec})$ times the receiver's cycle time plus the latency of the reverse channel plus the reverse latency of the sender's FIFO buffer plus the latency of the forward channel.

In a further variation, the number of black tokens in the receiver's FIFO buffer is less than or equal to the number of black tokens in the sender's FIFO buffer, the cycle time for the sender's FIFO buffer is less than the cycle time for the receiver; and the forward latency in the sender's FIFO buffer is less than or equal to $(nb_{send}-nb_{rec})$ times the sender's cycle time plus the latency of the forward channel plus the forward latency of the receiver's FIFO buffer plus the latency of the reverse channel.

In a further variation, the latency of the forward communication channel plus the forward latency for the receiver's FIFO buffer plus the latency of the reverse communication channel plus the reverse latency for the sender's FIFO buffer is less than or equal to $(nw_{send}+nb_{rec})$ times the minimum of the sender's and receiver's cycle times.

BRIEF DESCRIPTION OF THE FIGURES

FIG. 4A illustrates tokens within a linear ripple FIFO in accordance with an embodiment of the present invention.

FIG. 4B illustrates tokens within a pointer FIFO in accordance with an embodiment of the present invention.

FIG. 4C illustrates tokens switching places within a linear FIFO in accordance with an embodiment of the present invention.

FIG. 4D illustrates tokens switching places within a pointer FIFO in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Communication Paths with FIFO Storage Units

Figure 2:
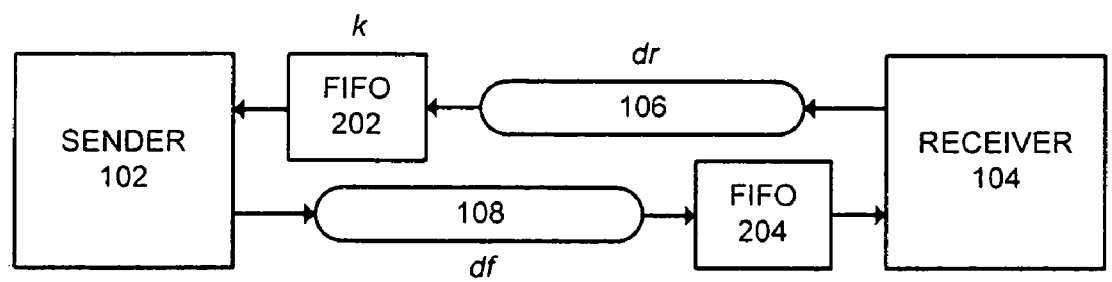
FIG. 2 illustrates FIFO storage units in the communication path between a sender and a receiver in accordance with an embodiment of the present invention.

FIG. 2 illustrates FIFO storage units included in the communication path between a sender and a receiver in accordance with an embodiment of the present invention. Sender's FIFO 202 is a k-place FIFO and the receiver's FIFO 204 is an l-place FIFO. Data items flow in the forward path and acknowledge tokens flow in the reverse path. Sender 102 communicates with sender's FIFO 202 through a simple request-acknowledge protocol. Each time that sender 102 removes an acknowledge token from sender's FIFO 202, sender 102 also inserts a data item into forward channel 108. When a data item arrives at the end of forward channel 108, the data item moves into receiver's FIFO 204, if there is space. Otherwise, the data item waits until space becomes available in receiver's FIFO 204.

A similar behavior occurs at receiver 104 and in reverse channel 106. Receiver 104 communicates with receiver's FIFO 204 through a simple request-acknowledge protocol. Each time that receiver 104 removes a data item from receiver's FIFO 204, receiver 104 also inserts an acknowledge token into reverse channel 106. When an acknowledge token arrives at the end of reverse channel 106, the acknowledge token moves into sender's FIFO 202, if there is space. Otherwise, the acknowledge token waits until space becomes available in sender's FIFO 202.

Figure 1:
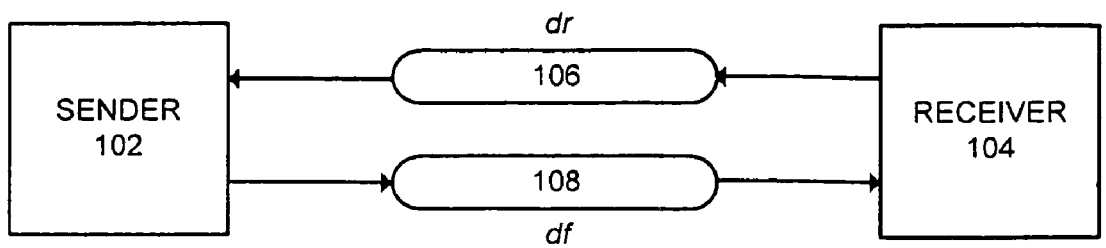
FIG. 1 illustrates communication channels between a sender and receiver.
Figure 3:
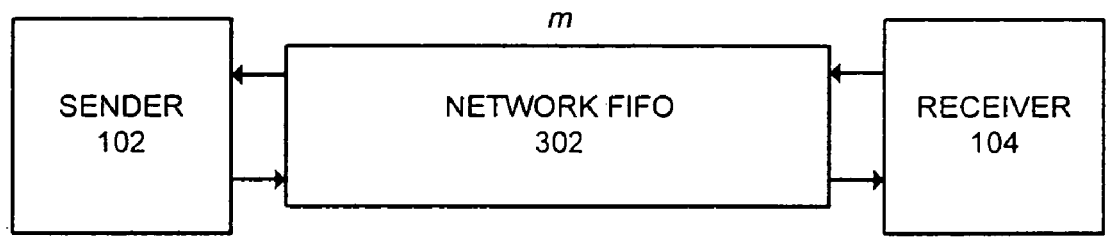
FIG. 3 illustrates a network FIFO between a sender and a receiver in accordance with an embodiment of the present invention.

If certain conditions are satisfied then the network of the communication channels and the FIFOs acts like a single m-place FIFO 302 as illustrated in FIG. 3. Furthermore, the throughput of the network is as high as the smaller throughput of sender 102 or receiver 104, which may be much higher than the throughput $1/(dr+df)$ of FIG. 1. The capacity m of network FIFO 302 depends on the initializations of the k- and l-place FIFOs.

There are two basic problems that this network must solve. First, no data items may be lost when traveling from sender 102 to receiver 104. The network can lose a data item when overflow occurs in receiver's FIFO 204. For reasons of symmetry, no acknowledge token may be lost when traveling from receiver 104 to sender 102. The network loses acknowledge tokens when overflow occurs in sender's FIFO 202.

Second, the maximum throughput of the network is the smaller of the maximum throughput of sender 102 and the maximum throughput of receiver 104. This requirement guarantees that sender 102 or receiver 104 limits the throughput of the composite, instead of the individual FIFOs or channels. More specifically, the second condition means that sender 102 never has to wait unnecessarily to send an item, nor does receiver 104 have to wait unnecessarily to remove an item. These two conditions taken together guarantee that the communication network operates reliably, with the highest throughput possible, and without unnecessary waits for sender 102 or receiver 104.

FIFOs and Tokens

FIG. 4A illustrates tokens within a linear ripple FIFO in accordance with an embodiment of the present invention. In order to abstract as much as possible from specific implementations, the behavior of the FIFOs and the channels are described as the movements of black and white tokens. A FIFO stage within FIFO 402 with a black token represents a FIFO stage with a request token, potentially containing a data item, and a FIFO stage with a white token represents a FIFO stage with an acknowledge token. Stages with acknowledge tokens may also be interpreted as "empty" stages. Each stage is either in a state where it includes a black token or a white token. By definition, black tokens always move in the forward direction, if possible, which in FIG. 4A is to the right. White tokens always move in the reverse direction, if possible, which in FIG. 4A is to the left.

In FIFO 402, black tokens move from the input of FIFO 402 to the output of FIFO 402 by moving from stage boundary to stage boundary and exchanging places with white tokens at stage boundaries. When both a black token and a white token have reached a common stage boundary, they exchange places instantly as illustrated in FIG. 4C. By symmetry, white tokens also move from stage boundary to stage boundary, but in the opposite direction, that is, from the output to the input of the FIFO 402. The movement of black tokens corresponds to the movement of data items from the input to the output of FIFO 402.

FIG. 4B illustrates tokens within a pointer or branching FIFO in accordance with an embodiment of the present invention. Notice that in branching FIFO 404 of FIG. 4B, a black token can exchange places with multiple white tokens. Such situations can occur in many FIFO implementations. In general, when a black token can exchange places with multiple white tokens, or a white token can exchange places with multiple black tokens, the particular FIFO implementation determines which tokens exchange places. This instantaneous exchange in FIFO 404 is illustrated in FIG. 4D.

The movements of black and white tokens provide an abstraction from specific events occurring in many circuit implementations of FIFOs. The most important events in each circuit implementation are the "firings" of certain gates that can be identified with the instantaneous exchanges of the black and white tokens. For example, the firings of the Rendezvous elements, also called C-elements, in a Chain of Rendezvous as well as the firings of specific NAND gates in asP* and GasP circuits all represent the same instantaneous exchanges of black and white tokens. As a consequence, the delays between the firings of these gates in successive stages determine the forward and reverse latencies of a stage and also the cycle time.

Whenever a particular implementation is considered, it is important to identify clearly the events that correspond to the instantaneous exchanges of black and white tokens. The values of all delay parameters, such as the cycle times and latencies, follow directly from this definition. A proper abstraction simplifies the reasoning about the network tremendously.

Path Initialization

Figure 5A:
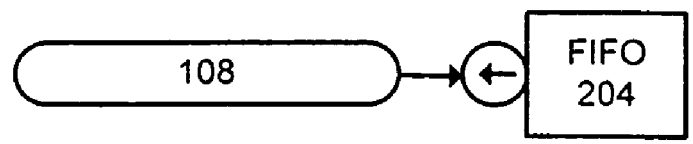
FIG. 5A illustrates initialization of a forward communication path in accordance with an embodiment of the present invention.
Figure 5B:
FIG. 5B illustrates initialization of a reverse communication path in accordance with an embodiment of the present invention.

FIG. 5A illustrates initialization of a forward communication path in accordance with an embodiment of the present invention. Instead of communicating through FIFOs, sender 102 and receiver 104 can also communicate through channels. When sender 102 inserts a token into forward channel 108 at one end, the token will propagate to the other end without being blocked. Upon arrival at the other end, usually at the boundary of a FIFO stage such as receiver's FIFO 204, the token will overwrite whatever token was present at the boundary. For correct operation, the arriving token must overwrite a token of the opposite color in order to avoid losing the arriving token. The conditions to avoid such loss of tokens in a FIFO network with channels are described below. Multiple tokens can be in flight in a channel at a given time but these tokens must remain separated during their flight for correct operation At the destination end of a channel it is assumed that there is always either a white or a black token. The reason for the presence of this token is to indicate whether the token wants to enter the FIFO or not. Thus, this is an indication of whether a token exchange with a token inside the FIFO can take place or not. Initially, each channel must include either a white or a black token at its destination. FIG. 5A depicts forward channel 108 initialized with a white token at receiver's FIFO 204. FIG. 5B depicts reverse channel 106 initialized with a white token at sender's FIFO 202. Initializations with a black token are similar. The initialization of a channel with either a black or white token is important. Because of these channel initializations, the system can indicate whether initially an exchange between a token inside and a token outside a FIFO may occur as illustrated in FIGS. 4C and 4D. Cycle time of a FIFO is defined as the minimum time between successive insertions of a black token into the FIFO. It is assumed that this cycle time is the same as the minimum time between successive removals of black tokens from the output of the FIFO, which in turn is the same as insertions of white tokens. The cycle time for sender's FIFO 202 in FIG. 2 is represented by $C_{send}$ and the cycle time for receiver's FIFO 204 is represented by $C_{rec}$.

FIFO Latencies

Figure 6A:
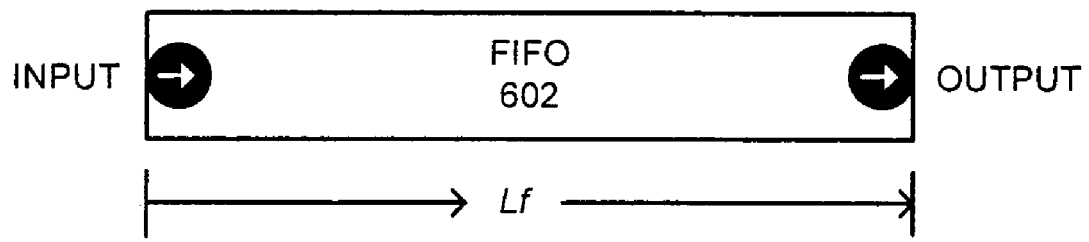
FIG. 6A illustrates forward latency of a FIFO in accordance with an embodiment of the present invention.
Figure 6B:
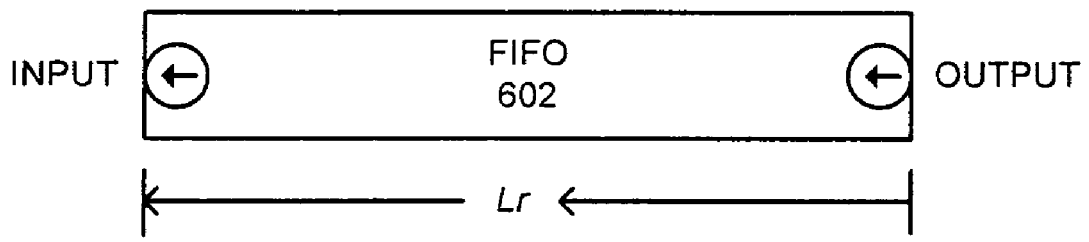
FIG. 6B illustrates reverse latency of a FIFO in accordance with an embodiment of the present invention.

FIG. 6A illustrates forward latency of a FIFO in accordance with an embodiment of the present invention. Besides a cycle time, each FIFO also has a forward and reverse latency. The forward latency for sender's FIFO in FIG. 2, denoted by $Lf_{send}$, is the minimum time a black token takes to travel from the input of sender's FIFO 202 to the output of sender's FIFO 202. It is assume that all forward paths through FIFOs have the same forward latency. The reverse latency for sender's FIFO 202, denoted by $Lr_{send}$, is the minimum time a white token takes to travel from the output of sender's FIFO 202 to the input of sender's FIFO 202. It is also assumed that all reverse paths through FIFOs have the same reverse latency. The forward and reverse latency for receiver's FIFO 204 may differ from those of sender's FIFO 202. These latencies are denoted by $Lf_{rec}$ and $Lr_{rec}$, respectively, and defined similarly. FIG. 6A illustrates the definition of forward latency for a general FIFO 602. FIG. 6B illustrates the definition of reverse latency for a general FIFO 602.

Four Stage FIFOs

Figure 7A:
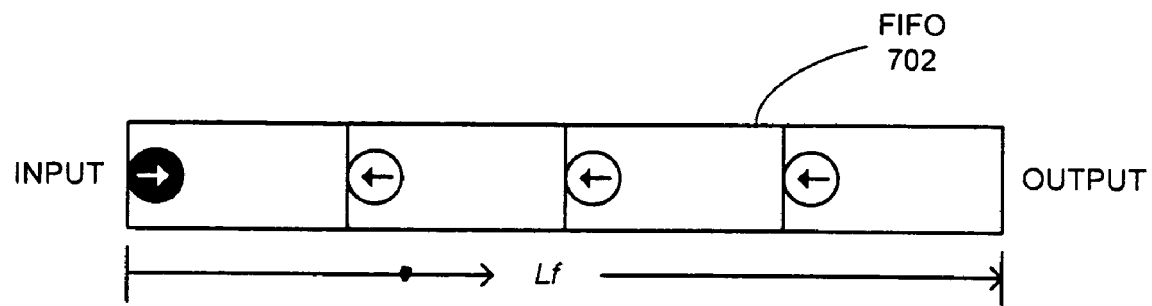
FIG. 7A illustrates forward latency of a four stage linear FIFO in accordance with an embodiment of the present invention.
Figure 7B:
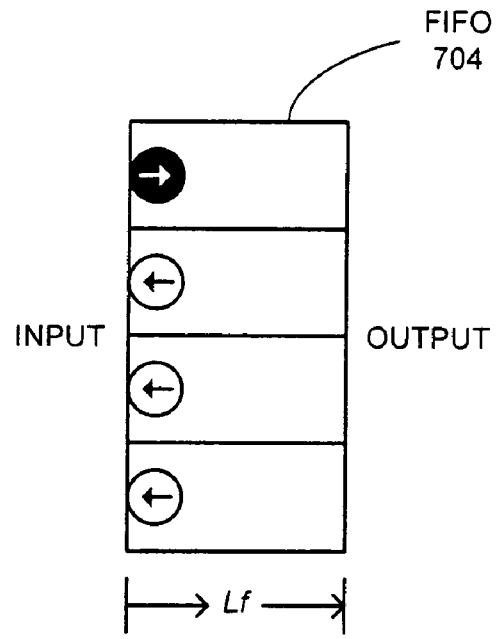
FIG. 7B illustrates forward latency of a four stage pointer FIFO in accordance with an embodiment of the present invention.

FIG. 7A illustrates forward latency of a four stage linear FIFO in accordance with an embodiment of the present invention, and FIG. 7B illustrates forward latency of a four stage pointer FIFO in accordance with an embodiment of the present invention. The forward latency of linear four-place FIFO 702 is four times the forward latency of a single stage of FIFO 702, whereas the forward latency of pointer FIFO 704 is only the forward latency of a single stage of FIFO 704. Note, however, that in general the latency of a single stage from pointer FIFO 704 is larger than the latency of a single stage from linear FIFO 702. The latency of a pointer-FIFO stage increases with the number of stages in the pointer FIFO. The size of these increments depends on the actual implementation.

There is a relationship between forward and reverse latencies of single stages of a FIFO and the cycle time of a FIFO: the cycle time of a FIFO is equal to the sum of the forward and reverse latency of a given stage in the FIFO. Which stage determines the actual cycle time depends on the actual FIFO implementation. In general, pointer FIFOs have lower latencies than linear ripple FIFOs, but pointer FIFOs also have larger cycle times. Between these two extremes many combinations exist with different cycle times and latencies. One part of the solution is to find a FIFO with a specific cycle time and a lowest latency.

System Operations

The movement of tokens between sender 102, sender's FIFO 202, and forward channel 108 is defined as follows. If sender 102 wants to send receiver 104 a black token and the last token in sender's FIFO 202 is white, the black and white token exchange places. Simultaneously, sender 102 sends a black token into forward channel 108. The black token appears at receiver's FIFO 204 after a delay df, which is determined by forward channel 108. In order to not lose any black tokens, the arriving black token must overwrite a white token in the channel. Thus, any previous black token in the channel must have entered receiver's FIFO 204. Although this requirement is a sufficient requirement, in order to simplify the analysis and to have some extra margin, a stronger requirement is imposed: the arriving black token must be able to move immediately into receiver's FIFO 204.

The movements between receiver 104, receiver's FIFO 204, and reverse channel 106 are defined similarly. If receiver 104 wants to send sender 102 a white token and the first token in receiver's FIFO 204 is black, the black and white token exchange places. Simultaneously, receiver 104 sends a white token into reverse channel 106. The white token appears at sender's FIFO 202 after a delay dr, which is determined by reverse channel 106. In order not to lose any white tokens, the arriving white token must overwrite a black token in the channel. Thus, any previous white token in the channel must have entered sender's FIFO 202. Although this requirement is a sufficient requirement, in order to simplify the analysis and to have some extra margin, a stronger requirement is imposed: the arriving white token must be able to move immediately into sender's FIFO 202.

There are two conditions that must be satisfied such that this composite network acts like a FIFO with a cycle time limited by the cycle time of sender 102 or receiver 104 and with capacity ($nw_{send} + nb_{rec}$) where $nw_{send}$ is the number of white tokens in send channel 108 and receiver's FIFO 204 and $nb_{rec}$ is the number of white tokens in receive channel 106 and sender's FIFO 202. In the formulas below, CS denotes the cycle time of the sender and CR denotes the cycle time of the receiver. Note that $CS \geq C_{send}$ and $CR \geq C_{rec}$.

1. The first condition guarantees that the network never loses a token. This condition has two subconditions.
   (a) The first subcondition guarantees that the network never loses a black token. This subcondition requires that whenever a black token arrives at receiver's FIFO 204, it overwrites a white token at the end of forward channel 108, and that the last token in receiver's FIFO 204 is white. The arriving black token then exchanges places with the last white token in FIFO 204, leaving again a white token outside of receiver's FIFO 204. For this condition to hold, it is necessary that:

$$nw_{send} \leq nw_{rec} \quad (1)$$

$$C_{rec} \leq CS \quad (2)$$

$$Lr_{rec} \leq (nw_{rec} - nw_{send}) * CR + dr + Lr_{send} + df \quad (3)$$

(b) The second subcondition guarantees that the network never loses a white token. This condition is similar to the previous subcondition. Whenever a white token arrives at sender's FIFO 202, it overwrites a black token at the end of reverse channel 106, and the first token in sender's FIFO 202 must be black. The arriving white token then exchanges places with the first black token in FIFO 202, leaving again a black token outside of sender's FIFO 202. For this condition to hold, it is necessary that:

$$nb_{rec} \leq nb_{send} \quad (4)$$

$$C_{send} \leq CR \quad (5)$$

$$Lf_{send} \leq (nb_{send} - nb_{rec}) * CS + df + Lf_{rec} + dr \quad (6)$$

2. The second condition guarantees that only sender 102 or receiver 104 limits the throughput of the composite, but not the FIFOs or the channels. In particular this means that neither sender 102 nor receiver 104 has to wait unnecessarily to insert or remove data items, respectively. The only additional condition that is needed is that the minimum forward delay from sender 102 to receiver 104 plus the minimum reverse delay from receiver 104 to sender 102 must be at most ($nw_{send} + nb_{rec}$)*min(CS, CR).

$$df + Lf_{rec} + dr + Lr_{send} \leq (nw_{send} + nb_{rec}) * \min(CS, CR) \quad (7)$$

Figure 8:
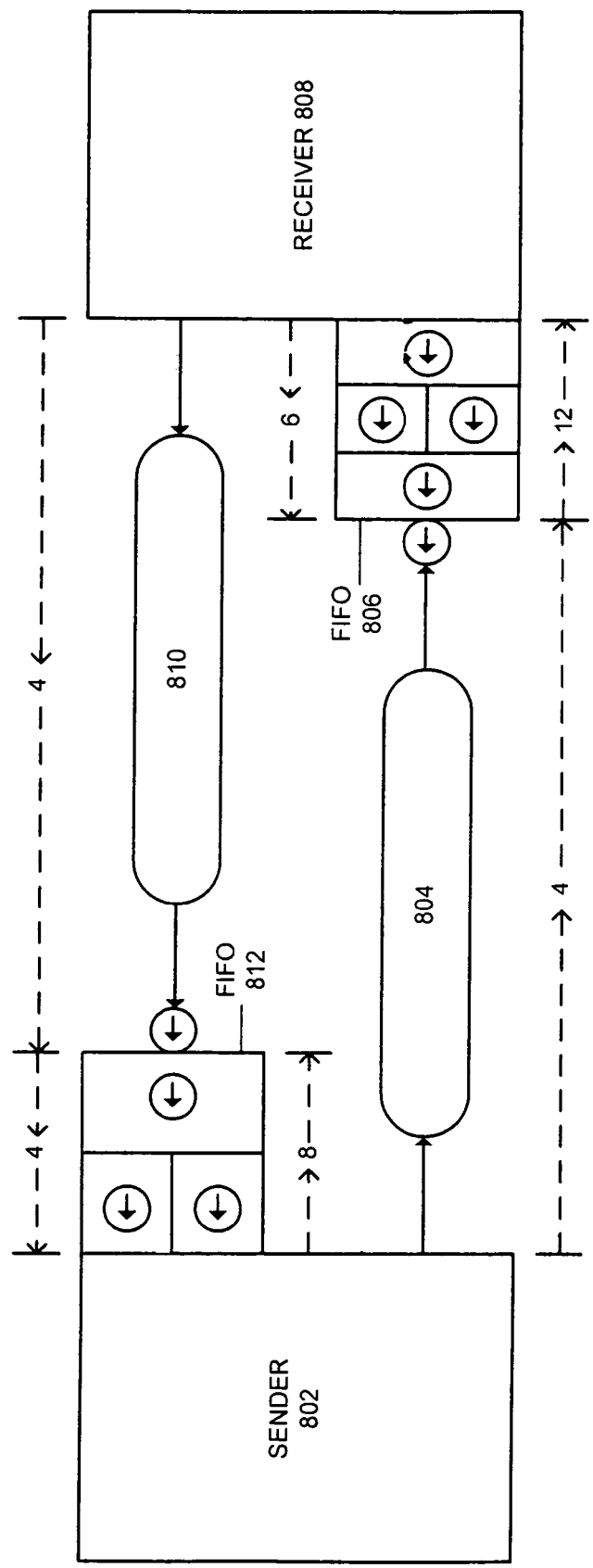
FIG. 8 illustrates an exemplary communication system between a sender and a receiver in accordance with an embodiment of the present invention.

Conditions (1) through (6) are necessary to guarantee correct functional operation of the network. Condition (7) is necessary only to guarantee the absence of unnecessary waits An Example FIG. 8 illustrates an exemplary communication system between a sender and a receiver in accordance with an embodiment of the present invention. Sender 802 is coupled to receiver 808 through forward channel 804 and receiver's FIFO 806. Receiver 808 is coupled to sender 802 through reverse channel 810 and sender's FIFO 812. Sender's FIFO 812 has a capacity of 3 and receiver's FIFO 806 has a capacity of 4. Both FIFOs are initially empty, that is, they include only white tokens. With these values inequalities (1) and (4) are obviously satisfied, because $4 = nw_{send} \leq nw_{rec} = 5$ and $0 = nb_{rec} \leq nb_{send} = 0$, respectively. Provided the other conditions are also satisfied, the composite behaves as a FIFO with capacity $nw_{send} + nb_{rec} = 4 + 0 = 4$.

The latencies for the FIFOs are as follows. The GasP implementation is a 2-4 GasP implementation, which means that the forward latency per stage is 4 gate delays and the reverse latency per stage is 2 gate delays. Each FIFO has two stages in parallel, the other stages are in linear order. As a consequence, the parameters for sender's FIFO 812 and receiver's FIFO 806 have the following values in units of gate delays.

$$Lf_{send} = 8, Lr_{send} = 4,$$
$$Lf_{rec} = 12, Lr_{rec} = 6.$$

Each FIFO has a cycle time of six gate delays, from which follows that the cycle times of sender 802 and receiver 808 are at least six gate delays. Consequently, inequalities (2) and (5) are satisfied.

The latencies of forward channel 804 and reverse channel 810 are each 4. Substituting these values in conditions (3) and (6) yields:

$$Lr_{rec} \leq 1 * CR + dr + Lr_{send} + df = 6 \leq CR + 4 + 4 + 4$$

$$Lf_{send} \leq 0 * CS + df + Lf_{rec} + dr = 8 \leq 4 + 12 + 4.$$

Notice that the first inequality has a margin of CR+6 gate delays and the second inequality has a margin of 12 gate delays. This provides adequate margin for variations in latencies due to differences in process parameters.

Finally the condition for the cycle times becomes:

$$df + Lf_{rec} + dr + Lr_{send} \leq 4 * \min(CS, CR)$$

assuming that sender 802 and receiver 808 are as fast as the FIFOs, i.e., CS=CR=6, then the inequality becomes:

$$4 + 12 + 4 + 4 \geq 24.$$

Consequently, even in the worst case condition 7 is satisfied. Thus the network will operate correctly, and the cycle time of the FIFO network is limited by the cycle time of sender 802 or receiver 808.

FIFO Behavior

Before justifying each of the conditions, it is necessary to prove that conditions (1)-(6) guarantee that the network functionally acts as a FIFO with capacity ($nw_{send} + nb_{rec}$). Assuming that conditions (1)-(6) are satisfied we prove that at any time during operation of the network, the number of white tokens in sender's FIFO 202 and reverse channel 106 plus the number of black tokens in receiver's FIFO 204 and forward channel 108 is constant and equal to their initial sum. Recall that initially the number of white tokens in sender's FIFO 202 and reverse channel 106 is $nw_{send}$. The number of black tokens in receiver's FIFO 204 and forward channel 108 initially is $nb_{rec}$. Thus, initially the sum of white tokens in sender's FIFO 202 and reverse channel 106 plus the number of black tokens in receiver's FIFO 204 and forward channel 108 is $nw_{send}+nb_{rec}$.

Denoting the number of white tokens in sender's FIFO 202 and reverse channel 106 at any time during operation by #white$_{send}$, and the number of black tokens in receiver's FIFO 204 and forward channel 108 at any time during operation by #black$_{rec}$, we prove that the following property is an invariant of the network at any time during operation.

$$\text{\#white}_{send}+\text{\#black}_{rec}=nw_{send}+nb_{rec} \quad (8)$$

We have already shown that the invariant holds initially.

The movements of black and white tokens within the FIFOs obviously leave the number of white and black tokens unchanged and, therefore, maintain the invariant. The only actions that change the number of black or white tokens are actions where tokens are interchanged between the various components in the network or the actions in a channel.

First, notice that when sender 102 removes a white token from sender's FIFO 202, sender 102 simultaneously inserts a black token into forward channel 108. These simultaneous actions maintain the invariant. The only other action of sender 102, inserting a black token in sender's FIFO 202, obviously also maintains the invariant.

Second, for reasons of symmetry, we notice that when receiver 104 removes a black token from receiver's FIFO 204, receiver 104 simultaneously inserts a white token into reverse channel 106. These simultaneous actions also maintain the invariant. The only other action of receiver 104, inserting a white token in receiver's FIFO 204, obviously maintains the invariant.

Third, we observe that when a black token moves through forward channel 108 into receiver's FIFO 204, the black token first overwrites a white token and then exchanges places with a white token in receiver's FIFO 204 by conditions (1)-(3). This action leaves the number of black tokens in forward channel 108 and receiver's FIFO 204 invariant, and therefore maintains (8).

Finally, for reasons of symmetry, we observe that when a white token in reverse channel 106 moves through reverse channel 106 into sender's FIFO 202, the white token first overwrites a black token and then exchanges places with a black token in sender's FIFO 202 by conditions (4)-(6). This action leaves the number of white tokens in reverse channel 106 and sender's FIFO 202 invariant, and therefore maintains (8). This concludes all actions that can affect the invariant.

In order to show that the composite network behaves as a FIFO with capacity $nw_{send}+nb_{rec}$, we have to show that any input-output behavior allowed by the network satisfies $0 \leq \text{\#black}_{rec} \leq nw_{send}+nb_{rec}$, where we assume that the number of black tokens in forward channel 108 and receiver's FIFO 204 represents the number of data items in the network. This property follows from the validity of invariant (8) together with the properties that at any time #white$_{send} \geq 0$ and #black$_{rec} \geq 0$.

Conversely, we also have to show that any input-output behavior that satisfies:

$$0 \leq \text{\#black}_{rec} \leq nw_{send}+nb_{rec}$$

is allowed by the network. Without proof, we state that this property holds as well. Finally, we observe that forward channel 108 and receiver's FIFO 204 maintain the order of black tokens. Consequently, we conclude that the network behaves as a FIFO with capacity $nw_{send}+nb_{rec}$.

Justification for Condition 1

In order for the network to avoid losing any tokens, we must ensure that whenever a black token moves from forward channel 108 to receiver's FIFO 204, the last token in receiver's FIFO 204 is white. Second we must ensure that whenever a white token moves from reverse channel 106 to sender's FIFO 202, the first token of sender's FIFO 202 is black.

Let us look at inequality (1) of the first condition. Initially sender 102 can insert as many black tokens in forward channel 108 and receiver's FIFO 204 as there are white tokens in sender's FIFO 202 and reverse channel 106. Initially there are $nw_{send}$ white tokens in sender's FIFO 202 and reverse channel 106, and there are $nw_{rec}$ white tokens in receiver's FIFO 204 and forward channel 108. Each white token in sender's FIFO 202 and reverse channel 106 can lead to an insertion of a black token in receiver's FIFO 204 and forward channel 108. Consequently, in order to prevent that the insertion of a black token in receiver's FIFO 204 and forward channel 108 causes overflow, a necessary condition is that $nw_{send} \leq nw_{rec}$, which explains inequality (1).

Next, let us look at inequality (2). Receiver's FIFO 204 can replenish white tokens at its input with a cycle time of $C_{rec}$ and, consequently, can accept black tokens with a cycle time of $C_{rec}$. Sender 102 and sender's FIFO 202, however, determine with what cycle time the black tokens arrive at receiver's FIFO 204. Black tokens can arrive at receiver's FIFO 204 with a cycle time CS. In order for receiver's FIFO 204 to keep up with the arrival of the black tokens, a necessary condition is $C_{rec} \leq CS$, which explains inequality (2).

Finally we explain inequality (3). This condition ensures that when a black token arrives at the input of receiver's FIFO 204, there is a matching white token waiting in receiver's FIFO 204. The white tokens travel from receiver 104 to the input of receiver's FIFO 204. If a white token is blocked by preceding white tokens, the white token will surely arrive at the input before the matching black token arrives. Recall that inequality (2) guarantees that the receiver's FIFO can replenish white tokens faster than the sender can send black tokens.

Let us continue with the case that no white tokens are blocked in receiver's FIFO 204 by any preceding white token. When receiver 104 inserts a white token in receiver's FIFO 204, receiver 104 also inserts a white token in reverse channel 106. The white token travels through reverse channel 106 and then through sender's FIFO 202. When the white token in sender's FIFO 202 becomes the last token, sender 102 replaces the white token with a black token and simultaneously inserts a black token in forward channel 108. When this black token arrives at the input of receiver's FIFO 204, the matching white token must have become the last token in receiver's FIFO 204. Both the black token in forward channel 108 and the white token in receiver's FIFO 204 originate from a white token in receiver 104. Finding out which white tokens they originate from in receiver 104 requires a bit of care, because receiver's FIFO 204 may have been initialized with more white tokens than sender's FIFO 202.

Suppose that the i-th white token inserted in reverse channel 106 by receiver 104 becomes the black token that matches up at the left input of receiver's FIFO 204 with the j-th token inserted by receiver 104 directly into receiver's FIFO 204. Because sender's FIFO 202 initially contains $nw_{send}$ white tokens and receiver's FIFO 204 contains $nw_{rec}$ white tokens, where $nw_{send} \leq nw_{rec}$, the relationship between i and j is $j=i+nw_{rec}-nw_{send}$.

For Condition 1 to hold, the following property must hold: if the j-th white token inserted in reverse channel 106 arrives as a black token at the input of receiver's FIFO 204, then the matching i-th white token inserted in receiver's FIFO 204 must have become the last token of receiver's FIFO 204. The latest time that the i-th white token inserted in receiver's FIFO 204 becomes the last white token is $Lr_{rec}$, when measured from the time that receiver 104 inserted the i-th token and assuming that no white tokens in receiver's FIFO 204 are blocked by a preceding white token. The earliest time that the matching j-th white token arrives as a black token at the input of receiver's FIFO 204 is $(nw_{rec}-nw_{send})*CR+dr+Lr_{send}+df$, also measured from the time that the i-th token left receiver 104. Consequently, when no white tokens are blocked at the input of receiver's FIFO 204, we must have:

$$Lr_{rec} \leq (nw_{rec}-nw_{send})*CR+dr+Lr_{send}+df$$

which explains inequality (3).

For reasons of symmetry, to satisfy Condition 1, we must also have conditions (4)-(6).

Justification for Condition 2

Condition 2 guarantees that sender 102 or receiver 104 limits the cycle time of the network, instead of the FIFOs and/or the channels. A different way of phrasing this condition is that neither sender 102 nor receiver 104 has to wait unnecessarily.

The cycle time of the network with sender 102 and receiver 104 is equal to the largest cycle time of all cycles in the network. When excluding sender 102 and receiver 104, the network involves three cycle times: the cycle time of sender's FIFO 202, the cycle time of receiver's FIFO 204, and the cycle time of a roundtrip. The time of a complete roundtrip consists of the forward latency through forward channel 108 and receiver's FIFO 204 plus the reverse latency through reverse channel 106 and sender's FIFO 202. One could say that in each roundtrip a black token travels from sender 102 to receiver 104 through the forward path, where it "bounces back" as a white token traveling through the reverse path. At sender 102, the white token will "bounce back" again as a black token to start the next roundtrip. The roundtrip cycle time is equal to:

$$df+Lf_{rec}+dr+Lr_{send}.$$

During each roundtrip, sender 102 inserts a total of $nw_{send}+nb_{rec}$ black tokens, the capacity of the network FIFO, and receiver 104 removes a total of $nw_{send}+nb_{rec}$ black tokens. Sender 102 can insert black tokens in forward channel 108 with a cycle time of at least CS. Receiver 104 can insert white tokens in reverse channel 106 with a cycle time of CR. In order to prevent an unnecessary wait by sender 102 or receiver 104, the roundtrip cycle time must be at most $(nw_{send}+nb_{rec})*CS$ and at most $(nw_{send}+nb_{rec})*CR$, which explains inequality (7).

Concluding Remarks

This method for hiding high-latency communication channels in FIFOs is a nice application of low-latency, high-throughput FIFOs. The formulas quantify each of the important characteristics of the FIFOs and the channels: throughput or cycle time, forward latency, reverse latency, capacity, and latency through the channels. The higher the throughput of the FIFOs, the higher the throughput can be of the composite network. The lower the latency of the FIFOs, the more compensation we have for the high latency in the communication channels and the smaller the FIFOs can be in terms of capacity. The formulas also show that we can trade off extra capacity in the individual FIFOs for more margin in some delay constraints.

We would like to emphasize that the proposed method works even when the latency in the communication channels is larger than the cycle time of the FIFOs. But notice, however, that under these conditions the communication channels must keep items sufficiently separated even when operating at high throughput and when there are multiple items in flight.

We have discussed networks with only a single forward channel and a single reverse channel. We remark, however, that the method generalizes without any difficulty to networks with multiple forward or reverse channels. The multiple channels are in fact similar to multiple parallel stages in a FIFO.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for high-throughput asynchronous communication, comprising:
    a sender;
    a receiver;
    a sender's first-in, first-out (FIFO) buffer coupled to an input of the sender;
    a receiver's FIFO buffer coupled to an input of the receiver;
    a forward communication channel coupled between the sender and the receiver's FIFO buffer; and
    a reverse communication channel coupled between the receiver and the sender's FIFO buffer;
    wherein the forward communication channel, the receiver's FIFO buffer, the reverse communication channel, and the sender's FIFO buffer operate collectively as a network FIFO between the sender and the receiver, wherein each time the sender removes a white token, which is an acknowledge token, from the sender's FIFO buffer, the sender inserts a black token, which is a request token, into the forward communication channel, and each time the receiver removes a black token from the receiver's FIFO buffer, the receiver inserts a white token into the reverse communication channel; and
    wherein the network FIFO is configured to ensure that asynchronous communication between the sender and the receiver takes place reliably and without unnecessary waiting by the sender or the receiver.

2. The apparatus of claim 1,
    wherein the sender's FIFO buffer and the reverse communication channel are initialized with $nw_{send}$ white tokens and $nb_{send}$ black tokens; and
    wherein the receiver's FIFO buffer and the forward communication channel are initialized with $nw_{rec}$ white tokens and $nb_{rec}$ black tokens.

3. The apparatus of claim 2, wherein the sender is configured to:
    remove a white token from the sender's FIFO buffer; and
    upon removing the white token, to
        insert a first black token into the sender's FIFO buffer, and to
        simultaneously insert a second black token into the forward communication channel.

4. The apparatus of claim 3, wherein the second black token comprises a data item.

5. The apparatus of claim 2, wherein the receiver is configured to:
  remove a black token from the receiver's FIFO buffer; and
  upon removing the black token, to
    insert a first white token into the receiver's FIFO buffer, and to
    simultaneously insert a second white token into the reverse communication channel.

6. The apparatus of claim 2,
  wherein a number of white tokens in the sender's FIFO buffer is less than or equal to a number of white tokens in the receiver's FIFO buffer;
  wherein a cycle time of the receiver's FIFO buffer is less than a cycle time of the sender; and
  wherein a reverse latency in the receiver's FIFO buffer is less than or equal to $(nw_{send} - nw_{rec})$ times the sum of the receiver's cycle time, the latency of the reverse channel, the reverse latency of the sender's FIFO buffer, and the latency of the forward channel.

7. The apparatus of claim 2,
  wherein a number of black tokens in the receiver's FIFO buffer is less than or equal to a number of black tokens in the sender's FIFO buffer;
  wherein a cycle time for the sender's FIFO buffer is less than a cycle time for the receiver; and
  wherein a forward latency in the sender's FIFO buffer is less than or equal to $(nb_{send} - nb_{rec})$ times the sum of the sender's cycle time, the latency of the forward channel, the forward latency of the receiver's FIFO buffer, and the latency of the reverse channel.

8. The apparatus of claim 2, wherein the sum of a latency of the forward communication channel, a forward latency for the receiver's FIFO buffer, a latency of the reverse communication channel, and a reverse latency for the sender's FIFO buffer is less than or equal to the sum of the number of white tokens in the sender's FIFO buffer and the number of black tokens in the receiver's FIFO buffer times the minimum of the sender's and receiver's cycle times.

9. A computer system for high-throughput asynchronous communication, comprising:
  a sender;
  a receiver;
  a sender's first-in, first-out (FIFO) buffer coupled to an input of the sender;
  a receiver's FIFO buffer coupled to an input of the receiver;
  a forward communication channel coupled between the sender and the receiver's FIFO buffer; and
  a reverse communication channel coupled between the receiver and the sender's FIFO buffer;
  wherein the forward communication channel, the receiver's FIFO buffer, the reverse communication channel, and the sender's FIFO buffer operate collectively as a network FIFO between the sender and the receiver, wherein each time the sender removes a white token, which is an acknowledge token, from the sender's FIFO buffer, the sender inserts a black token, which is a request token, into the forward communication channel, and each time the receiver removes a black token from the receiver's FIFO buffer, the receiver inserts a white token into the reverse communication channel; and
  wherein the network FIFO is configured to ensure that asynchronous communication between the sender and the receiver takes place reliably and without unnecessary waiting by the sender or the receiver.

10. The computer system of claim 9,
  wherein the sender's FIFO buffer and the reverse communication channel are initialized with $nw_{send}$ white tokens and $nb_{send}$ black tokens; and
  wherein the receiver's FIFO buffer and the forward communication channel are initialized with $nw_{rec}$ white tokens and $nb_{rec}$ black tokens.

11. The computer system of claim 10, wherein the sender is configured to:
  remove a white token from the sender's FIFO buffer; and
  upon removing the white token, to
    insert a first black token into the sender's FIFO buffer, and to
    simultaneously insert a second black token into the forward communication channel.

12. The computer system of claim 11, wherein the second black token comprises a data item.

13. The computer system of claim 10, wherein the receiver is configured to:
  remove a black token from the receiver's FIFO buffer; and
  upon removing the black token, to
    insert a first white token into the receiver's FIFO buffer, and to
    simultaneously insert a second white token into the reverse communication channel.

14. The computer system of claim 10,
  wherein a number of white tokens in the sender's FIFO buffer is less than or equal to a number of white tokens in the receiver's FIFO buffer;
  wherein a cycle time of the receiver's FIFO buffer is less than a cycle time of the sender; and
  wherein a reverse latency in the receiver's FIFO buffer is less than or equal to $(nw_{send} - nw_{rec})$ times the sum of the receiver cycle time, the latency of the reverse channel, the reverse latency of the sender's FIFO buffer, and the latency of the forward channel.

15. The computer system of claim 10,
  wherein a number of black tokens in the receiver's FIFO buffer is less than or equal to a number of black tokens in the sender's FIFO buffer;
  wherein a cycle time for the sender's FIFO buffer is less than a cycle time for the receiver; and
  wherein a forward latency in the sender's FIFO buffer is less than or equal to $(nb_{send} - nb_{rec})$ times the sum of the sender cycle time, the latency of the forward channel, the forward latency of the receiver's FIFO buffer, and the latency of the reverse channel.

16. The computer system of claim 10, wherein the sum of a latency of the forward communication channel, a forward latency for the receiver's FIFO buffer, a latency of the reverse communication channel, and a reverse latency for the sender's FIFO buffer is less than or equal to the sum of the number of white tokens in the sender's FIFO buffer and the number of black tokens in the receiver's FIFO buffer times the minimum of the sender and the receiver cycle times.

17. A method for high-throughput asynchronous communication, comprising:
  removing a white token, which is an acknowledge token, from a sender's first-in, first-out (FIFO) storage unit at the sender; and
  upon removing the white token,
    inserting a first black token, which is a request token, into the sender's FIFO storage unit, and
    simultaneously inserting a second black token into a forward communication channel, which is coupled to a receiver's FIFO storage unit;

whereby removing the white token ensures that the forward communication channel has room for the second black token;

removing a black token from a receiver's FIFO storage unit; and upon removing the black token,
   inserting a first white token into the receiver's FIFO storage unit, and
   simultaneously inserting a second white token into a reverse communication channel which is coupled to the sender's FIFO storage unit;

whereby removing the black token ensures that the reverse communication channel has room for the second white token.

18. The method of claim 17, wherein the second black token comprises a data item.

19. The method of claim 18,
   wherein a count of white tokens in the sender's FIFO storage unit is less than or equal to a count of white tokens in the receiver's FIFO storage unit; and
   wherein a cycle time for the receiver's FIFO storage unit is less than a cycle time for the sender.

20. The method of claim 18, wherein a count of black tokens in the receiver's FIFO storage unit is less than or equal to a count of black tokens in the sender's FIFO storage unit; and
   wherein a cycle time for the sender's FIFO storage unit is less than a cycle time for the receiver.

21. The method of claim 18, wherein the sum of a latency of the forward communication channel, a forward latency for the receiver's FIFO storage unit, a latency of the reverse communication channel, and a reverse latency for the sender's FIFO storage unit is less than or equal to the sum of a count of white tokens in the sender's FIFO storage unit and the count of black tokens in the receiver's FIFO storage unit times the sender's cycle time.

* * * * *